(12) United States Patent
Jayaprakash et al.

(10) Patent No.: US 11,102,250 B2
(45) Date of Patent: Aug. 24, 2021

(54) CONTROLLING BEHAVIOR OF AN INTERNET OF THINGS (IOT) AUTOMATION SYSTEM BY IDENTIFYING POLICY VIOLATIONS

(71) Applicant: Tata Consultancy Services Limited, Mumbai (IN)

(72) Inventors: Rajesh Jayaprakash, Chennai (IN); Srinarayana Nagarathinam, Chennai (IN); Venkatesh Ramanathan, Pune (IN); Ramasubramanian Suriyanarayanan, Chennai (IN); Anand Sivasubramaniam, Chennai (IN)

(73) Assignee: Tata Consultancy Services Limited, Mumbai (IN)

( * ) Notice: Subject to any disclaimer, the term of this patent is extended or adjusted under 35 U.S.C. 154(b) by 393 days.

(21) Appl. No.: 16/285,395

(22) Filed: Feb. 26, 2019

(65) Prior Publication Data

US 2020/0112588 A1 Apr. 9, 2020

(30) Foreign Application Priority Data

Oct. 3, 2018 (IN) .............................. 201821037320

(51) Int. Cl.
*H04L 29/06* (2006.01)

(52) U.S. Cl.
CPC .......... *H04L 63/20* (2013.01); *H04L 63/1416* (2013.01); *H04L 63/302* (2013.01)

(58) Field of Classification Search
CPC .... H04L 63/20; H04L 63/1416; H04L 63/302
(Continued)

(56) References Cited

U.S. PATENT DOCUMENTS

2011/0099126 A1 4/2011 Belani et al.
2016/0124071 A1 5/2016 Baxley et al.
(Continued)

OTHER PUBLICATIONS

R. Camacho et al., "Intelligent Actuation in Home and Building Automation Systems", Telecomunications and Informatics Engineering, 76 pages, http://web.ist.utl.pt/rui.camacho/assets/METI-65998-Rui-Camacho-Thesis.pdf (2014).
(Continued)

*Primary Examiner* — Michael S McNally
(74) *Attorney, Agent, or Firm* — Finnegan, Henderson, Farabow, Garrett & Dunner, LLP

(57) ABSTRACT

Identifying policy violations for controlling behavior of an Internet of Things (IoT) automation system is provided. Traditional systems and methods provide for controlling IoT based automation system based upon a static analysis of a system model and rules. The embodiments of the proposed disclosure provide for controlling behavior of the IoT automation system by identifying one or more policy violations, wherein the one or more policy violations are identified by generating a plurality of models representing behavior, relationships and functions of one or more sub-systems corresponding to the IoT automation system; extracting a set of modelled rules; constructing, using each of the plurality of models and the set of modelled rules, an integrated model; and identifying, from the integrated model, the one or more policy violations via a Model Verifier Component for controlling behavior of the IoT automation system.

9 Claims, 4 Drawing Sheets

(58) Field of Classification Search
USPC .......................................................... 726/1
See application file for complete search history.

(56) References Cited

U.S. PATENT DOCUMENTS

| | | | |
|---|---|---|---|
| 2018/0039238 A1* | 2/2018 | Gartner | G05B 23/0251 |
| 2018/0137858 A1* | 5/2018 | Saxena | G10L 15/30 |
| 2018/0191729 A1* | 7/2018 | Whittle | H04L 67/12 |
| 2019/0236493 A1* | 8/2019 | Cam-Winget | H04L 63/1425 |

OTHER PUBLICATIONS

R. Sandhu et al., "Authentication, Access Control, and Intrusion Detection", Access Control: Principles and Practice in IEEE Communications, vol. 32, No. 9, pp. 40-48, http://citeseerx.ist.psu.edu/viewdoc/download?doi=10.1.1.26.153&rep=rep1&type=pdf (2004).
R. Camacho, "Intelligent Actuation In Home and Building Automation Systems", 10 pages, http:/fenix.tecnico.ulisboa.pt/downloadfile/844820067123846/meti-65998-rui-camacho-extended%20abstract.pdf.

* cited by examiner

CONTROLLING BEHAVIOR OF AN INTERNET OF THINGS (IOT) AUTOMATION SYSTEM BY IDENTIFYING POLICY VIOLATIONS

PRIORITY CLAIM

This U.S. patent application claims priority under 35 U.S.C. § 119 to: India Application No. 201821037320, filed on Oct. 3, 2018. The entire contents of the aforementioned application are incorporated herein by reference.

TECHNICAL FIELD

This disclosure relates generally to Internet of Things (IoT) based automation systems, and, more particularly, to identifying policy violations for controlling of behavior of Internet of Things (IoT) automation systems.

BACKGROUND

The Internet of things (IoT) is an inter-networking of physical devices, vehicles, buildings, and other items embedded with electronics, software, sensors, actuators, and network connectivity that enable these objects to collect and exchange data. The IoT based devices typically gather data and stream it over the Internet to a central source, where it is analyzed and processed. The capabilities of devices connected to the IoT platform continue to advance by combining data into more useful information. Rather than just reporting raw data, connected devices are required to send higher-level information back to machines, computers, and people for further evaluation and decision making.

An important application of the IoT based automation systems comprises home automation systems. Home automation is the process of controlling home appliances automatically using various control system techniques. The electrical and electronic appliances in the home such as fan, lights, outdoor lights, fire alarm, kitchen timer, etc., can be controlled using various control techniques. Wireless home automation using IOT is an innovative application of internet of things developed to control home appliances remotely over the cloud.

There are various techniques to control home appliances such as IOT based home automation over the cloud, home automation under WiFi through android apps from any smartphone, Arduino based home automation, home automation by android application based remote control, home automation using digital control, RF based home automation system and touch screen based home automation. Traditional systems and methods simply provide for controlling the IoT based automation systems based upon a set of static/monolithic analysis of system model (s) only.

SUMMARY

Embodiments of the present disclosure present technological improvements as solutions to one or more of the above-mentioned technical problems recognized by the inventors in conventional systems. For example, in one embodiment, a method for identifying policy violations for controlling behavior of an Internet of Things (IoT) automation system is provided, the method comprising: performing, by one or more hardware processors, a plurality of steps in parallel, wherein the plurality of steps comprise: (i) obtaining, via a Rules Input Component, a first set of information comprising a set of rules from a plurality of sources, wherein the first set of information defines control logics of the IoT automation system; and (ii) generating, from a second set of information, a plurality of models representing behavior, relationships and functions of one or more sub-systems corresponding to the IoT automation system, wherein the second set of information comprises a pre-defined set of information on the IoT automation system; extracting, from the first set of information, a rules model via a Rules Model Component, wherein the rules model comprises a set of modelled rules corresponding to the first set of information; constructing, using each of the plurality of models and the rules model, an integrated model via an Integrated Model Constructor, wherein the integrated model comprises a synchronized hybrid model of the IoT automation system; identifying, from the integrated model, one or more policy violations via a Model Verifier Component for controlling behavior of the IoT automation system and the one or more sub-systems corresponding to the IoT automation system; representing the rules model by a set of codes for constructing the integrated model, and wherein the representation is performed by implementing the rules model component; defining an optimum sequence of rules for controlling behavior of the IoT automation system and the one or more sub-systems corresponding to the IoT automation system; and identifying a set of conflicting rules to optimize controlling behavior of the IoT automation system and the one or more sub-systems corresponding to the IoT automation system.

In another aspect, there is provided a system for identifying policy violations for controlling behavior of an Internet of Things (IoT) automation system, the system comprising a memory storing instructions; one or more communication interfaces; and one or more hardware processors coupled to the memory via the one or more communication interfaces, wherein the one or more hardware processors are configured by the instructions to: perform a plurality of steps in parallel, wherein the plurality of steps comprise: (i) obtain, via a Rules Input Component, a first set of information comprising a set of rules from a plurality of sources, wherein the first set of information defines control logics of the IoT automation system; and (ii) generate, from a second set of information, a plurality of models representing behavior, relationships and functions of one or more sub-systems corresponding to the IoT automation system, wherein the second set of information comprises a pre-defined set of information on the IoT automation system; extract, from the first set of information, a rules model via a Rules Model Component, wherein the rules model comprises a set of modelled rules corresponding to the first set of information; construct, using each of the plurality of models and the rules model, an integrated model via an Integrated Model Constructor, wherein the integrated model comprises a synchronized hybrid model of the IoT automation system; identify, from the integrated model, one or more policy violations via a Model Verifier Component for controlling behavior of the IoT automation system and the one or more sub-systems corresponding to the IoT automation system; represent the rules model by a set of codes for constructing the integrated model, and wherein the representation is performed by implementing the rules model component; define an optimum sequence of rules for controlling behavior of the IoT automation system and the one or more sub-systems corresponding to the IoT automation system; and identify a set of conflicting rules to optimize controlling behavior of the IoT automation system and the one or more sub-systems corresponding to the IoT automation system.

In yet another aspect, there is provided one or more non-transitory machine readable information storage mediums comprising one or more instructions which when executed by one or more hardware processors causes the one or more hardware processors to perform a method for identifying policy violations for controlling behavior of an Internet of Things (IoT) automation system, the method comprising: performing a plurality of steps in parallel, wherein the plurality of steps comprise: (i) obtaining, via a Rules Input Component, a first set of information comprising a set of rules from a plurality of sources, wherein the first set of information defines control logics of the IoT automation system; and (ii) generating, from a second set of information, a plurality of models representing behavior, relationships and functions of one or more sub-systems corresponding to the IoT automation system, wherein the second set of information comprises a pre-defined set of information on the IoT automation system; extracting, from the first set of information, a rules model via a Rules Model Component, wherein the rules model comprises a set of modelled rules corresponding to the first set of information; constructing, using each of the plurality of models and the rules model, an integrated model via an Integrated Model Constructor, wherein the integrated model comprises a synchronized hybrid model of the IoT automation system; identifying, from the integrated model, one or more policy violations via a Model Verifier Component for controlling behavior of the IoT automation system and the one or more sub-systems corresponding to the IoT automation system; representing the rules model by a set of codes for constructing the integrated model, and wherein the representation is performed by implementing the rules model component; defining an optimum sequence of rules for controlling behavior of the IoT automation system and the one or more sub-systems corresponding to the IoT automation system; and identifying a set of conflicting rules to optimize controlling behavior of the IoT automation system and the one or more sub-systems corresponding to the IoT automation system.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Figure 1:
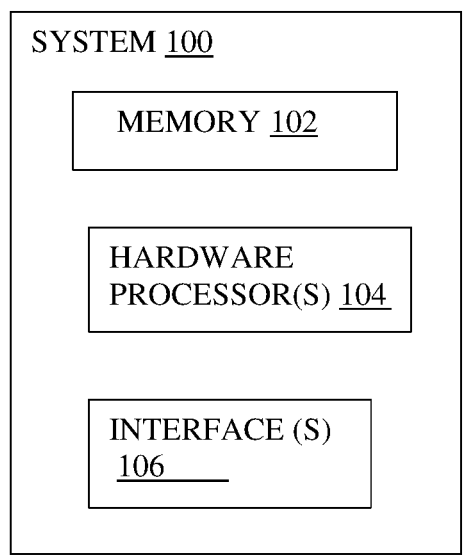
FIG. 1 illustrates a block diagram of a system for identifying policy violations for controlling behavior of an Internet of Things (IoT) automation system, in accordance with some embodiments of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Embodiments of the present disclosure provide systems and methods for identifying policy violations for controlling behavior of an Internet of Things (IoT) automation system. With the availability of high speed mobile networks like fourth generation (4G) networks or even fifth generation (5G) networks coupled with cheaper and accessible smart phones, mobile industry has seen a tremendous growth in terms of providing various services and applications at finger tips of humans. Internet of Things (IoT) is one of the promising technologies which can be used for connecting, controlling and managing intelligent objects which are connected to Internet through an IP address. Applications ranging from smart governance, smart education, smart agriculture, smart health care, smart homes etc. can use IoT for effective delivery of services without manual intervention in a more effective manner.

IoT based building automation systems encompass a wide variety of systems that aid in the monitoring and control of various aspects of building operation. Building automation systems (which may also be referred to herein as "building control systems") include security systems, fire safety systems, lighting systems, and heating, ventilation, and air conditioning (HVAC) systems. Lighting systems and the HVAC systems are sometimes referred to as "environmental control systems" because these systems control the environmental conditions within the building. A single facility may include multiple building automation systems (e.g., a security system, a fire system and an environmental control system).

Controlling of IoT based automation systems comprises monitoring behavior and control logics of such systems and corresponding sub-systems, so that a robust and calibrated model of both system behavior and the control logics of the IoT automation system may be delivered. Given a set of rules, verification of the rules to eliminate inconsistencies amongst the set of rules comprises examining one or more conditions of the rules, identify variables/parameters involved in the one or more conditions, and trying out all possible combinations of values that these parameters can take. For each of said various possible combinations, it needs to be checked if there occur any situations in which two or more rules conditions are satisfied by a single combination, thereby resulting in these rules executing at the same time and setting a single variables value to multiple, mutually contradicting values.

Traditional systems and methods provide for identifying such inconsistencies, but these are applied in a static manner, for example, by taking as an input only the text of the rules, and the various combinations of the variables involved in the set of rules. However, such a static approach is quite inefficient because it would consider all the values that a variable is permitted to take (for example, a variable representing the return air temperature could be assumed to be in the range of 0 degrees Celsius to 40 degrees Celsius), whereas, in reality, the values of the return air temperature would be dictated by the behavior of the building, as simulated by the validated and calibrated building model, and would be a much smaller set of values.

The proposed disclosure provides for overcoming the limitations of the traditional systems and methods. For example, the proposed disclosure facilitates for an identification of policy violations for controlling behavior of the IoT based automation system(s) and corresponding sub-systems corresponding to the IoT based automation system(s). The proposed disclosure further provides for a dynamic verification of the control logics based upon one or more variables of sub-systems of the IoT based automation systems, wherein the one or more variables are not static, and are only known at the time of execution of a model of the system behavior of the IoT automation system.

Referring now to the drawings, and more particularly to FIG. 1 through 4, where similar reference characters denote corresponding features consistently throughout the figures, there are shown preferred embodiments and these embodiments are described in the context of the following exemplary system and/or method.

FIG. 1 illustrates an exemplary block diagram of a system 100 for identifying policy violations for controlling behavior of an Internet of Things (IoT) automation system, in accordance with an embodiment of the present disclosure. In an embodiment, the system 100 includes one or more processors 104, communication interface device(s) or input/output (I/O) interface(s) 106, and one or more data storage devices or memory 102 operatively coupled to the one or more processors 104. The one or more processors 104 that are hardware processors can be implemented as one or more microprocessors, microcomputers, microcontrollers, digital signal processors, central processing units, state machines, logic circuitries, and/or any devices that manipulate signals based on operational instructions. Among other capabilities, the processor(s) is configured to fetch and execute computer-readable instructions stored in the memory 102. In an embodiment, the system 100 can be implemented in a variety of computing systems, such as laptop computers, notebooks, hand-held devices, workstations, mainframe computers, servers, a network cloud and the like.

The I/O interface device(s) 106 can include a variety of software and hardware interfaces, for example, a web interface, a graphical user interface, and the like and can facilitate multiple communications within a wide variety of networks N/W and protocol types, including wired networks, for example, LAN, cable, etc., and wireless networks, such as WLAN, cellular, or satellite. In an embodiment, the I/O interface device(s) can include one or more ports for connecting a number of devices to one another or to another server.

The memory 102 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes.

Figure 2:
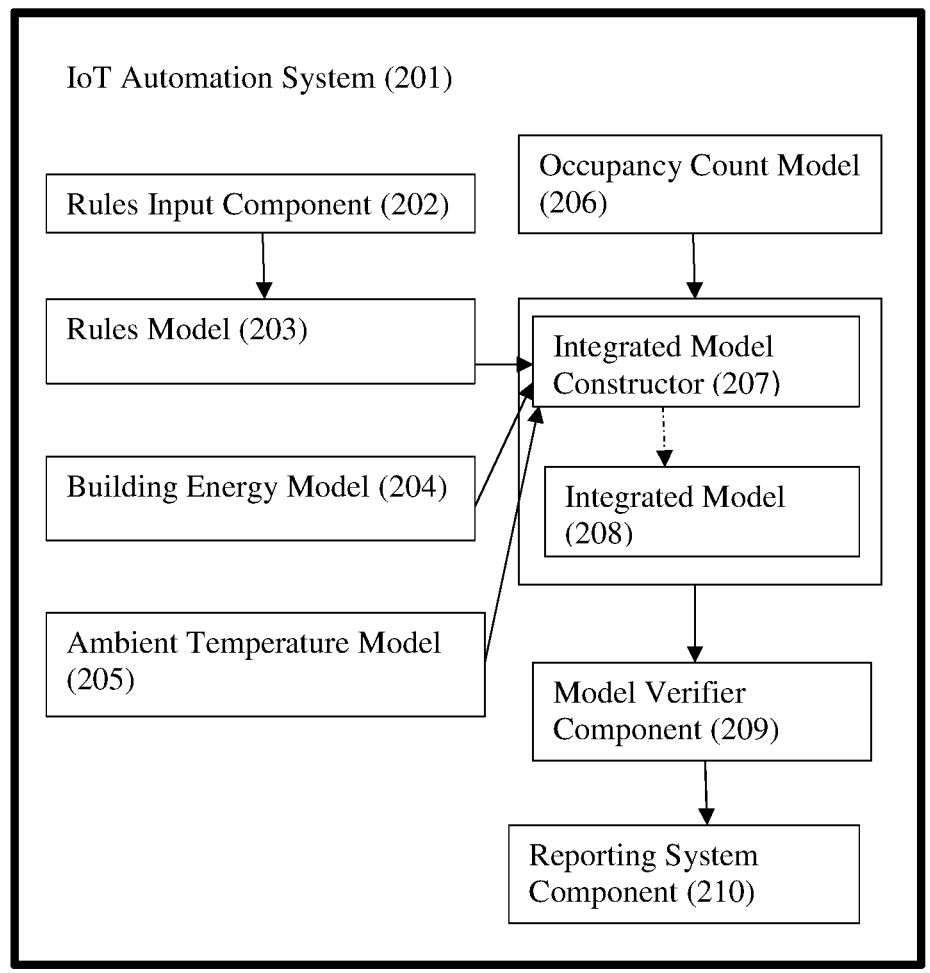
FIG. 2 is an architectural diagram depicting components and flow of the system for identifying the policy violations for controlling behavior of the IoT automation system, in accordance with some embodiments of the present disclosure.

According to an embodiment of the present disclosure, by referring to FIG. 2, the architecture of the system for identifying the policy violations for controlling behavior of the IoT automation system may be considered. By referring to FIG. 2, it may be noted that the IoT Automation System 201 (on which the proposed methodology has been tested and implemented) comprises a Rules Input Component 202, wherein the Rules Input Component 202 facilitates obtaining of a first set of information; A Rules Model 203; A Building Energy Model 204; An Ambient Temperature Model 205; An Occupancy Count Model 206, An Integrated Model Constructor 207, An Integrated Model 208, A Model Verifier Component 209, and a Reporting System Component 210.

Herein, the Rules Input Component 202 facilitates obtaining of the first set of information comprising rules to define control logics of the IoT automation system 201. The rules model 203 comprises modelled rules corresponding to the first set of information. The rules model 203 is extracted using a Rules Model Component (not shown in the figure). The Building Energy Model 204, the Ambient Temperature Model 205, and the Occupancy Count Model 206 represent behavior, relationships and functions of sub-systems corresponding to the IoT automation system 201. The Integrated Model Constructor 207 facilitates construction of the Integrated Model 208, and the Integrated Model 208 in-turn facilitates identification of violations or conflicts in policies using the Model Verifier Component 209. The Reporting System Component 210 facilitates identification of conflicting rule(s).

Figure 3:
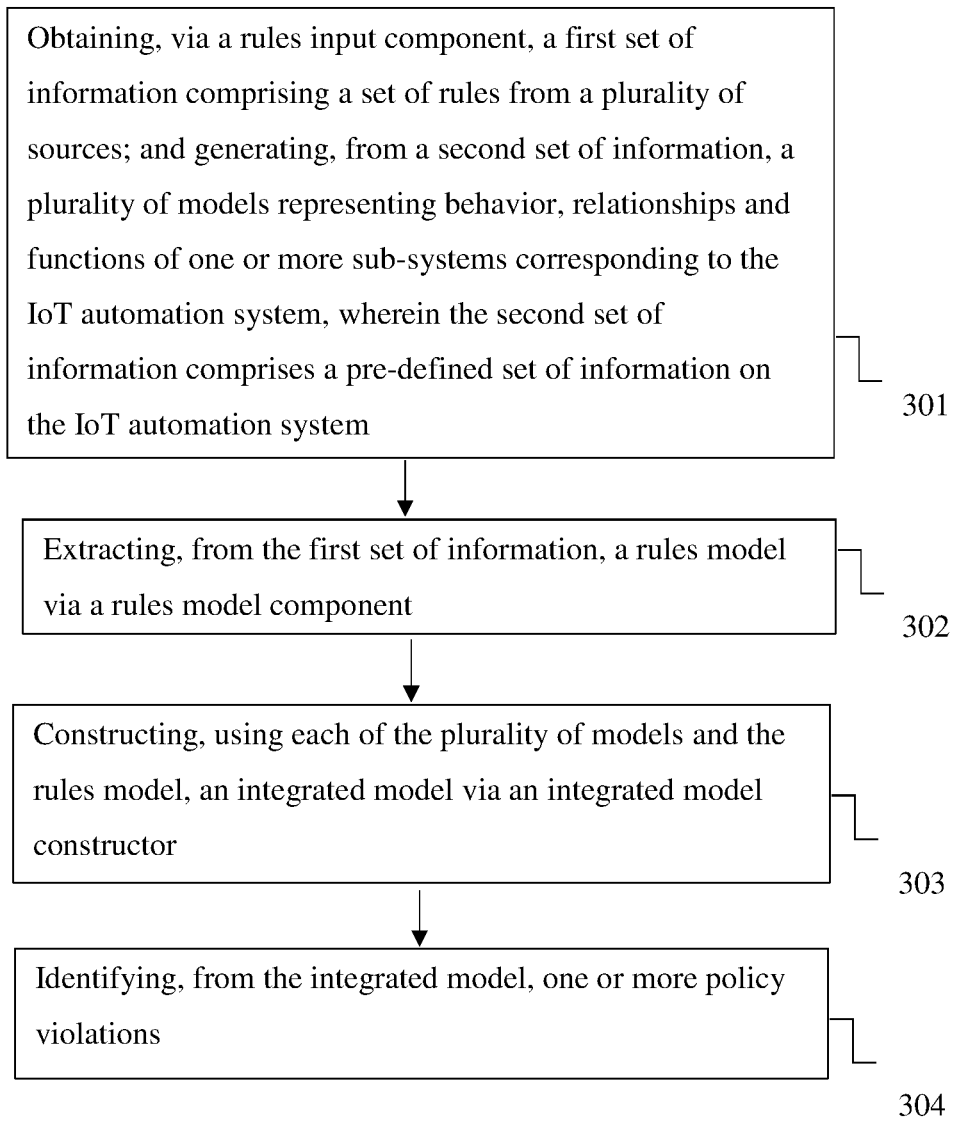
FIG. 3 is a flow diagram illustrating the steps involved in the process of identifying the policy violations for controlling behavior of the IoT automation system, in accordance with some embodiments of the present disclosure.
Figure 4:
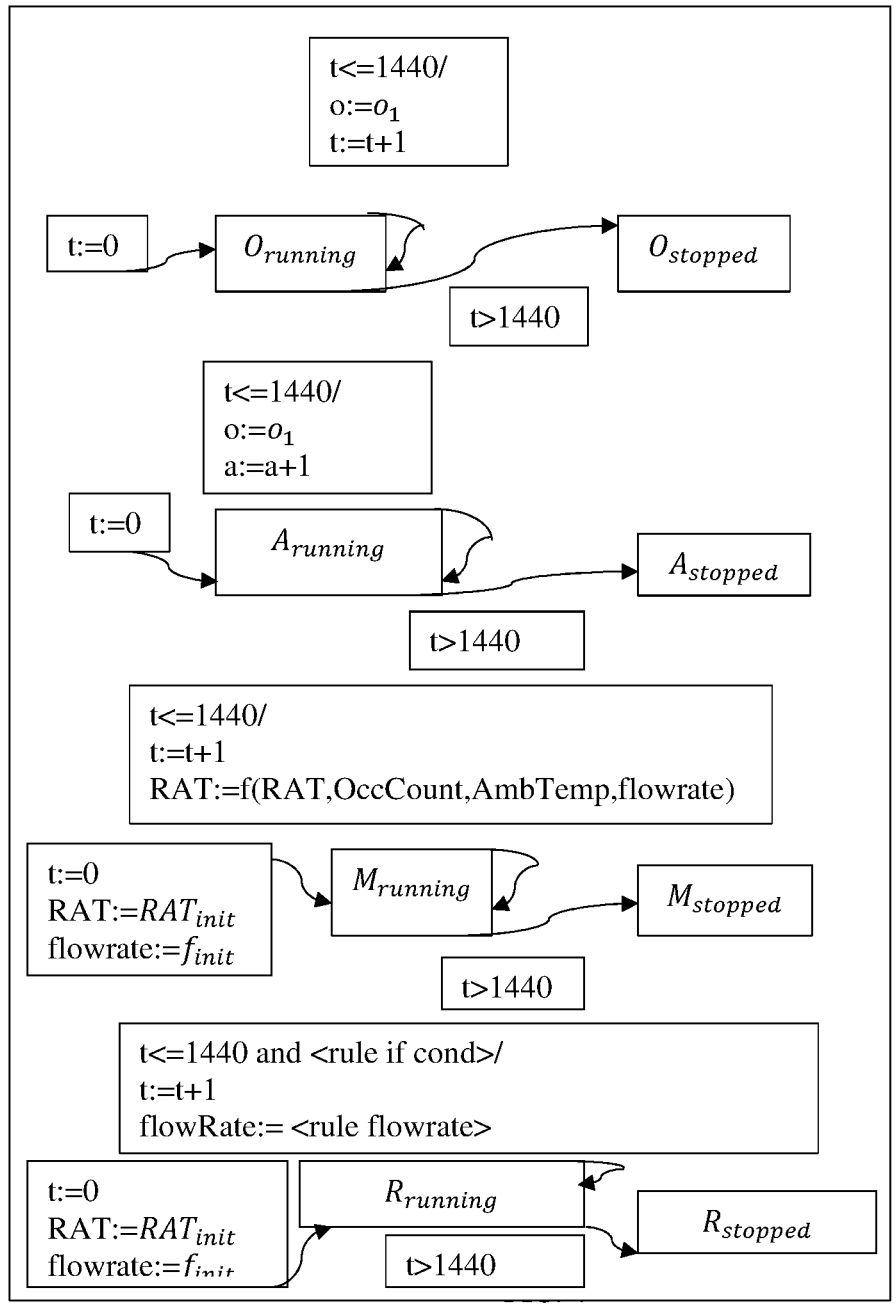
FIG. 4 illustrates an example of an Integrated Model constructed for identifying the policy violations, in accordance with some embodiments of the present disclosure.

FIG. 3, with reference to FIG. 1 and FIG. 2, illustrates an exemplary flow diagram of a method for identifying the policy violations for controlling behavior of the IoT automation system, in accordance with some embodiments of the present disclosure. In an embodiment the system 100 comprises one or more data storage devices of the memory 102 operatively coupled to the one or more hardware processors 104 and is configured to store instructions for execution of steps of the method by the one or more processors 104. The steps of the method of the present disclosure will now be explained with reference to the components of the system 100 as depicted in FIG. 1 and the flow diagram. In the embodiments of the present disclosure, the hardware processors 104 when configured the instructions performs one or more methodologies described herein.

According to an embodiment of the present disclosure, at step 301, the one or more hardware processors 104 perform a plurality of steps in parallel. At step 301, the one or more hardware processors 104 obtain, via the Rules Input Component 202, the first set of information from a plurality of sources, wherein the first set of information comprises a set of rules, and wherein the first set of information or the set of rules define control logics of the IoT automation system 201.

In an embodiment, the first set of information performs preliminary checks, for example, correctness of syntax, whether a comparison of variables with permissible values have been performed, or whether the permissible values have been assigned to the variables, and the like. Considering an example scenario, the set of rules may be compared to the permissible values (for example, allowing the variable 'occupancy count' to be compared to a value selected from a drop-down list comprising the permissible values (0, 20, 40, 60, 10), checking that a variable is between permissible minimum and maxim values, and the like). The Rules Input Component 202 takes the rules in the form of 'if-the-else' statements. Considering an example scenario, the first set of information may be obtained as below:

Referring to the above example scenario, a sample of a set of textual rules may be referred. While some of the variables in the above examples comprise state variables (for example, occupancyCount, ambientTemp, returnAirTemp, flowrate), while others (for example, currentTime) may not be the state variables. As is known in the art, a state variable is one of the set of variables that are used to describe the mathematical "state" of a dynamical system.

IF occupancyCount>0 and ambientTemp>returnAirTemp THEN flowrate=MAX;

IF occupancyCount>0 and returnAirTemp>SetPoint THEN flowrate=MAX;

IF occupancyCount>0 and returnAirTemp<SetPoint THEN flowrate=MAX/4;

IF occupancyCount>0 and returnAirTemp=SetPoint THEN flowrate=MAX/2;

IF StartOfWorkingHours−CurrentTime=30 THEN flowrate=MAX; and

IF EndOfWorkingHours−CurrentTime=30 THEN flowrate=0.

According to an embodiment of the present disclosure, at step 301 the one or more hardware processors 104 further generate, from a second set of information, a plurality of models representing behavior, relationships and functions of one or more sub-systems (not shown in the figure) corresponding to the IoT automation system 201. The second set of information comprises a pre-defined set of information on the IoT automation system 201. Implementation and execution of generating the plurality of models may be explained by considering an example scenario of the IoT automation system 201.

In a building automation system, the pre-defined set of information (or the second set of information) may comprise defining an ambient room temperature, return air temperature, occupancy count and a flow rate. Further, the one or more sub-systems for the building automation system may comprise a temperature control system, a fire detection system, a Close Circuit Television (CCTV) system and the like. The plurality of models that may thus be generated using the second set of information may comprise (but not limited to) the building energy model 204, the ambient temperature model 205, and the occupancy count model 206.

In an embodiment, each of the plurality of models further facilitate providing one or more commands and thereby coordinating the one or more subsystems, as the building automation system requires a precise control, a robust and reliable networking, and a secured system maintenance. Thus, each of the plurality of models may be generated to represent behavior, relationships and functions of the one or more sub-systems corresponding to the IoT automation system 201. Considering the same example scenario of the building automation system, the plurality of models may be generated using the second set of information as below:

Building Energy Model 204

The building energy model 204 encapsulates the relationship between the state variables of the energy model for the building (for example, return air temperature, ambient temperature, occupancy count, flow rate etc.). The building energy model 204 may further enable the IoT automation system 201 to compute the state variables at a particular time given their values at the previous time. Time could be a second or a minute, depending on the desired accuracy of the IoT automation system 201. In an example implementation, the building energy model 204 may be represented as below equation—

$$T^{t+1} = T^t + 6.25 \times 10^{-6} \left( 100 * occ_{count} + \frac{T^t_\infty - T^t}{0.00004} + m * 1005 * (13 - T^t) \right)$$

Referring to above equation, it may be noted that the building energy model 204 relates the return air temperature at time t+1 to the return air temperature, the occupancy count, the ambient temperature and the flow rate variables at time t. As mentioned above, the time may be measured in intervals of minutes or seconds, depending on the desired accuracy of the IoT automation system 201. It may be noted that the above equation may be converted into an equivalent code using a model checking language, for example, PROMELA (Process or Protocol Meta Language).

Ambient Temperature Model 205

Similar to the occupancy count model 206, the ambient temperature model 205 models the ambient temperature of the building, however, using one or more non-integral values as well. Referring to below example of the generated ambient temperature model 205, it may be noted that the ambient temperature model 205 may assume values from a set, and the model checker picks values from this set non-deterministically. Further, the ambient temperature model 205 may also model the ambient temperature using one or more decimal values (not shown in the example).

```
/* process to model the non-determinism of ambient temperature */
proctype A( )
{
int tA=1;
do :: tA==tMax->break;
:: else->
(var == 3);
if
:: tA <= tMax -> ambTemp = 20;
:: tA <= tMax -> ambTemp = 21;
:: tA <= tMax -> ambTemp = 22;
:: tA <= tMax -> ambTemp = 23;
:: tA <= tMax -> ambTemp = 24;
:: tA <= tMax -> ambTemp = 25;
:: tA <= tMax -> ambTemp = 26;
:: tA <= tMax -> ambTemp = 27;
:: tA <= tMax -> ambTemp = 28;
:: tA <= tMax -> ambTemp = 29;
:: tA <= tMax -> ambTemp = 30;
:: tA <= tMax -> ambTemp = 31;
:: tA <= tMax -> ambTemp = 32;
:: tA <= tMax -> ambTemp = 33;
:: tA <= tMax -> ambTemp = 34;
:: tA <= tMax -> ambTemp = 35;
:: tA <= tMax -> ambTemp = 36;
:: tA <= tMax -> ambTemp = 37;
:: tA <= tMax -> ambTemp = 38;
:: tA <= tMax -> ambTemp = 39;
:: tA <= tMax -> ambTemp = 40;
fi
var = 4;
tA++;
od;
finish++;
}
```

Occupancy Count Model 206

The Occupancy count model models the variation in the occupancy count of the building. Given a permissible range of values for the occupancy count, for example, 0-100, the model selects a value from this range for each time tick. The occupancy count model 206 may be created for the building automation system as below.

```
/* process to model the non-determinism of occupancy count */
proctype O( )
{
int t0=1;
do :: t0==tMax->break;
```

```
    :: else->
    (var == 4);
    if
    :: t0 <= tMax -> occCount = 0;
    :: t0 <= tMax -> occCount = 20;
    :: t0 <= tMax -> occCount = 40;
    :: t0 <= tMax -> occCount = 60;
    :: t0 <= tMax -> occCount = 80;
    :: t0 <= tMax -> occCount = 100;
    fi
    var = 1;
    t0++;
    od;
    finish++;
}
```

Referring to above codes corresponding to the Occupancy count model 206, it may be noted that codes represents a process that sets the value for the variable occCount for each of the time ticks 1 to tMax. The variable t0 is initially set to 1, and the do . . . od syntax loops this variable through all the values till tMax (incrementing the variable by one for each iteration). Within the loop, each line of the code within the if . . . fi syntax checks for the condition 't0 <=tMax', and if the condition is satisfied, the variable occCount is set to one the values from the set (0, 20, 40, 60, 80, 100).

The presence of multiple (six) such identical conditions implies that a random or a non-deterministic choice is made from the values in the set for each time tick. The code involving the variable 'var' is used to synchronize this process with the processes for the ambient temperature and the rules model 203. The statement '(var==4);' makes this process wait until the condition 'var==4' is satisfied (which occurs when the other processes have set their respective variables for the concerned time tick). In effect, this ensures that all the processes make their variable updates in sync.

Referring to the above example of the occupancy count model 206, it may be note that the occupancy count may be modeled to assume values from the set {0,20,40,60,80,100}, and a non-deterministic choice is made at each time tick from this set. Thus, when the model checking is complete, all the possible combinations of occupancy counts for a time duration of interest (0 to tMax) may be considered for the verification. It may be noted that the embodiments of the proposed disclosure do not restrict the occupancy count model 206 to assume values from the above set {0,20,40, 60,80,100}only. The embodiments of the proposed disclosure facilitates assuming any number of values within 1 to 100, including increments of 1.

According to an embodiment of the present disclosure, at step 302, the one or more hardware processors 104 extract, from the first set of information, the rules model 203 via the Rules Model Component (not shown in the figure), wherein the rules model 203 comprises a set of modelled rules corresponding to the first set of information. The Rules Model Component thus models the textual representation of the first set of information (that is, the set of rules) into a set of corresponding codes (via the rules model 203), so that the set of corresponding codes may be used as an input by the Integrated Model Constructor 207 for constructing the integrated model 208 (explained later) and thereby facilitating identification of policy violations.

In an embodiment, the rules model 203 may also be represented by a set of codes for constructing the integrated model 208. In an example implementation, the rules model 203 may be extracted as:

```
/* process for the rules model */
proctype R( )
{
    int tR = 0;
    int simul_rules;
    int zeroOccCountInst = 0;
    /* byte ppd_flag; */
    do :: tR > tMax -> break
       :: else ->
            (var == 2);
            c_code
            {
                if(now.occCount > 0)
                    PR->zeroOccCountInst = 0;
                else
                    PR->zeroOccCountInst++;
                PR->simul_rules = 0;
                /* 1. if nobody is present for 15 minutes, set
flow rate to zero */
                if(PR->zeroOccCountInst == 15)
                {
                    now.flowRate = 0;
                    PR->simul_rules++;
                }
                /* 2. if ambient temperature is greater than
return air temperature,
                set flow rate to max */
                if(now.occCount > 0 && now.ambTemp >
now.RAT)
                {
                    now.flowRate = 20;
                    PR->simul_rules++;
                }
                /* 3. if return air temperature is greater than
desired temperature (25),
                set flow rate to max */
                if(now.occCount > 0 && now.RAT > 25)
                {
                    now.flowRate = 20;
                    PR->simul_rules++;
                }
                /* 4. if return air temperature is less than desired
temperature (25),
                set flow rate to (max / 4) */
                if(now.occCount > 0 && now.RAT < 25)
                {
                    now.flowRate = 5;
                    PR->simul_rules++;
                }
                /* 5. if return air temperature is equal to
desired temperature (25),
                set flow rate to (max / 2) */
                if(now.occCount > 0 && RAT == 25)
                {
                    now.flowRate = 10;
                    PR->simul_rules++;
}
```

Referring to example, it may be noted that the codes the variable 'flowRate' is updated for each time tick based on whether one (or more) of the rule(s) is satisfied. If multiple rules are satisfied at a single time tick, the variable 'simul_rules' will contain a value greater than 1, indicating a conflict. The rest of the working of the rules mode code is similar to the above two models.

According to an embodiment of the present disclosure, at step 303, the one or more hardware processors 104 construct the integrated model 208 via the Integrated Model Constructor 207, based upon each of the plurality of models and the rules model 203. The integrated model 208 comprises a synchronized hybrid model of the IoT automation system 201, wherein each of the plurality of models are executing in parallel. The Integrated Model Constructor 207 thus takes each of the plurality of models and the rules model 203 as an input, and generates the integrated model 208 (to be verified by the Model Verifier Component 209) as output.

The constructed integrated model 208 thus serves as an input for identifying the policy violations. Considering the same example scenario of the building automation system and referring to FIG. 4, the integrated model 208 may be constructed may be referred. Referring to FIG. 4 again, it may be noted that the constructed integrated model 208 may be represented by a transition system, wherein the number of transitions correspond to a number of changes values in the state variables over the time duration of interest (0 to tMax).

According to an embodiment of the present disclosure, at step 304, the one or more hardware processors 104 identify, from the integrated model 208, one or more policy violations by implementing a Model Verifier Component 209. The identification of the one or more policy violations control behavior of the IoT automation system 201 and the one or more sub-systems corresponding to the IoT automation system 201. The process of identifying the one or more policy violations from the constructed integrated model 208 may now be considered in detail in the light of the limitations of the traditional systems and methods.

In general, due to the complexity of an IoT systems, the security and privacy of the IoT systems and related devices represent critical issues, and hence adequate policies must be correctly distributed and applied to the information made available by the IoT network to secure the data themselves and to regulate the access to the managed resources over the whole IoT system. Policy defining mainly involve the access to resources and are usually defined and established in accordance with the rules of each specific domain.

While the traditional system and methods may provide for defining/establishing policies for the IoT systems, the traditional system and methods may fail to provide for detecting policy violations in any IoT based automation systems by generating sub-models corresponding to automation systems. The proposed disclosure thus facilitates overcoming limitations of the traditional systems and methods by identifying the one or more policy violations for controlling behavior of the IoT automation system 201 and the one or more sub-systems corresponding to any of the IoT based automation system(s).

Identification of Policy Violations or Conflicts

In an embodiment, the one or more policy violations may be defined as two rules being active at the same time (because 'if' conditions of the two rules are satisfied), and as a result of which, a variable is set to two conflicting values (example, rule R1 set variable flow_rate to 100, while rule R2 sets the same variable to 200). Initially, the integrated model 208 is given as an input to the Model Verifier Component 209.

The Model Verifier Component 209 then checks for the one or more policy violations (or conflicts) as a plurality of transitions in the integrated model 208, that is, in the rules model part of the integrated model 208 (recall from the steps 303 above that the integrated mode is a synchronized hybrid model, wherein each of the plurality of models are executing in parallel), wherein each of the plurality of transitions are enabled at the same time.

Referring to FIG. 4 yet again, it the plurality of transitions indicated by arrows in $R_{running}$ state may be referred. Referring to FIG. 4 yet again, it may be noted that the number of loops correspond to the number of rules, that is, there are as many loops as there are rules, thereby meaning that each rule may be represented by one arrow starting from $R_{running}$ and ending at $R_{running}$. The output of the verification process may comprise of a list of timestamped rule numbers, and one or more values of the various variables at the specified timestamp.

Considering an example scenario, suppose there are two rules as below:

R1: If t<1440 and occupancyCount<100 set flow_rate=100; and

R2: If t<1440 and occupancyCount<200 set flow_rate=200 wherein flow_rate is a state variable of the IoT automation system 201.

The transition from $R_{running}$ to $R_{stopped}$ is enabled by the condition t>=1440 (end of the period under condition=24 hours=24×60=1440 minutes). Considering an example scenario, at time t=68 minutes, the occupancyCount is 75 (as set by the occupancy count model 206). This means that both rules R1 and R2 are fired and satisfied, and the flow rate could assume either a value of 100 or 200, thereby indicating that both the transitions may be enabled simultaneously. The condition is a conflict or violation, and the proposed disclosure facilitates identifying such violations and conflicts.

Considering another example scenario, suppose the occupancy count at t=68 minutes is 125. In this case, only rule R2 will be fired, since only its condition (occupancyCount<200) would be satisfied. There would thus be no multiple transitions enabled (only the arrow corresponding to rule R2 would be enabled), and thus no conflict. Finally, the Reporting System Component (210) upon obtaining the communication from the Model Verifier Component 209, indicates which of the rules are in conflict with each other.

Referring to the above example, it may be noted that the step of identification of the one or more policy violations comprise an identification of a set of conflicting rules generated via the Reporting System Component (210), and wherein the identification of the set of conflicting rules optimizes controlling behavior of the IoT automation system 201 and the one or more sub-systems corresponding to the IoT automation system 201, as the identification of the one or more policy violations (or conflicts) facilitates overall optimization of the security and privacy of the IoT systems and related devices.

By identifying the one or more policy violations, an optimum sequence of rules may thus be defined for controlling behavior of the IoT automation system 201 and the one or more sub-systems corresponding to the IoT automation system 201. Considering the same example scenario as discussed in the identification of the one or more policy violations, if the rules R1 and R2 are in conflict with each other, the flow_rate of the rule R2 may be modified to say 100 (that is, similar to the rule R1).

According to an embodiment of the present disclosure, advantages of the proposed methodology may now be considered. The proposed methodology provides for a flexibility in generating sub-models using the pre-defined set of information on the IoT automation system 201. This provides a greater flexibility in identifying violations in the IoT based utomation systems. By identifying the one or more policy violations from the integrated model 208 (wherein the integrated model 208 is constructed using each of the plurality of models), the proposed disclosure facilitates a greater security, and thus, facilitates building and maintaining robust IoT system platform. Further, the proposed disclosure provides for a flexibility in introducing a new set of rules or modifying an existing set of rules to generate a new set of modelled rules.

Depending upon the requirements and development of the IoT automation systems from time-to-time (for example, when the number of users increase), the proposed disclosure facilitates enhancement of the overall security of the IoT based automation systems. As shown and discussed above, the proposed disclosure thus overcomes limitations of the traditional systems and methods by identifying the one or more policy violations for controlling behavior of the IoT automation system 201 and the one or more sub-systems corresponding to the IoT based automation system(s).

In an embodiment, the memory 102 can be configured to store any data that is associated with identifying the one or more policy violations for controlling behavior of the IoT automation system 201. In an embodiment, the information pertaining to the first set of information, the second set of information, the rules model 203, the plurality of models, and the one or more identified policy violations etc. is stored in the memory 102. Further, all information (inputs, outputs and so on) pertaining to identifying the one or more policy violations for controlling behavior of the IoT automation system 201, may also be stored in the database, as history data, for reference purpose.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software modules located therein. Thus, the means can include both hardware means and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A processor-implemented method for identifying policy violations for controlling behavior of an Internet of Things (IoT) automation system, the method comprising:

performing, by one or more hardware processors, a plurality of steps in parallel, wherein the plurality of steps comprise (301):

obtaining, via a Rules Input Component, a first set of information comprising a set of rules from a plurality of sources, wherein the first set of information defines control logics of the IoT automation system; and generating, from a second set of information, a plurality of models representing behavior, relationships and functions of one or more sub-systems corresponding to the IoT automation system, wherein the second set of information comprises a pre-defined set of information on the IoT automation system;

extracting, from the first set of information, a rules model via a Rules Model Component, wherein the rules model comprises a set of modelled rules corresponding to the first set of information (302);

constructing, using each of the plurality of models and the rules model, an integrated model via an Integrated Model Constructor, wherein the integrated model comprises a synchronized hybrid model of the IoT automation system (303), wherein each of the plurality of models are executed in parallel and in the rules model part of the integrated model, each of plurality of transitions are enabled at the same time; and identifying, from the integrated model, the policy violations via a Model Verifier Component for controlling behavior of the IoT automation system and the one or more sub-systems corresponding to the IoT automation system (304), wherein the identification of the policy variations include an identification of a set of conflicting rules generated via a Reporting System Component and wherein the identification of the set of conflicting rules optimizes control of behavior of the IoT automation system and the one or more sub-systems corresponding to the IoT automation system.

2. The method as claimed in claim 1, wherein the rules model is further represented by a set of codes for constructing the integrated model, and wherein the representation is performed by implementing the rules model component.

3. The method as claimed in claim 1, wherein the step of identifying the one or more policy violations facilitates defining an optimum sequence of rules for controlling behavior of the IoT automation system and the one or more sub-systems corresponding to the IoT automation system.

4. A system (100) for identifying policy violations for controlling behavior of an Internet of Things (IoT) automation system (201), the system (100) comprising:
 a memory (102) storing instructions;
 one or more communication interfaces (106); and
 one or more hardware processors (104) coupled to the memory (102) via the one or more communication interfaces (106), wherein the one or more hardware processors (104) are configured by the instructions to:
  perform a plurality of steps in parallel, wherein the plurality of steps comprise:
   obtain, via a Rules Input Component (202), a first set of information comprising a set of rules from a plurality of sources, wherein the first set of information defines control logics of the IoT automation system (201); and
   generate, from a second set of information, a plurality of models representing behavior, relationships and functions of one or more sub-systems corresponding to the IoT automation system (201), wherein the second set of information comprises a pre-defined set of information on the IoT automation system (201);
  extract, from the first set of information, a rules model (203) via a Rules Model Component, wherein the rules model (203) comprises a set of modelled rules corresponding to the first set of information;
  construct, using each of the plurality of models and the rules model (203), an integrated model (208) via an Integrated Model Constructor (207), wherein the integrated model (208) comprises a synchronized hybrid model of the IoT automation system (201), wherein each of the plurality of models are executed in parallel and in the rules model part of the integrated model, each of plurality of transitions are enabled at the same time; and
  identify, from the integrated model (208), the policy violations via a Model Verifier Component (209) for controlling behavior of the IoT automation system (201) and the one or more sub-systems corresponding to the IoT automation system (201), wherein the identification of the one or more policy variations include an identification of a set of conflicting rules generated via a Reporting System Component and wherein the identification of the set of conflicting rules optimizes control of behavior of the IoT automation system and the one or more sub-systems corresponding to the IoT automation system.

5. The system (100) as claimed in claim 4, wherein the one or more hardware processors (104) are configured to represent the rules model (203) by a set of codes for constructing the integrated model (208), and wherein the representation is performed by implementing the rules model component.

6. The system (100) as claimed in claim 4, wherein the one or more hardware processors (104) are configured to define an optimum sequence of rules for controlling behavior of the IoT automation system (201) and the one or more sub-systems corresponding to the IoT automation system (201).

7. One or more non-transitory machine readable information storage mediums comprising one or more instructions which when executed by one or more hardware processors cause:
 performing, by one or more hardware processors, a plurality of steps in parallel, wherein the plurality of steps comprise (301):
  obtaining, via a Rules Input Component, a first set of information comprising a set of rules from a plurality of sources, wherein the first set of information defines control logics of an Internet of Things (IoT) automation system; and
  generating, from a second set of information, a plurality of models representing behavior, relationships and functions of one or more sub-systems corresponding to the IoT automation system, wherein the second set of information comprises a pre-defined set of information on the IoT automation system;
 extracting, from the first set of information, a rules model via a Rules Model Component, wherein the rules model comprises a set of modelled rules corresponding to the first set of information (302);
 constructing, using each of the plurality of models and the rules model, an integrated model via an Integrated Model Constructor, wherein the integrated model comprises a synchronized hybrid model of the IoT automation system (303), wherein each of the plurality of models are executing in parallel and in the rules model part of the integrated model, each of plurality of transitions are enabled at the same time; and
 identifying, from the integrated model, the policy violations via a Model Verifier Component for controlling behavior of the IoT automation system and the one or more sub-systems corresponding to the IoT automation system (304), wherein the identification of the one or more policy variations include an identification of a set of conflicting rules generated via a Reporting System Component and wherein the identification of the set of conflicting rules optimizes control of behavior of the IoT automation system and the one or more sub-systems corresponding to the IoT automation system.

8. The one or more non-transitory machine readable information storage mediums of claim 7, wherein the rules model is further represented by a set of codes for constructing the integrated model, and wherein the representation is performed by implementing the rules model component.

9. The one or more non-transitory machine readable information storage mediums of claim 7, wherein the step of identifying the one or more policy violations facilitates defining an optimum sequence of rules for controlling behavior of the IoT automation system and the one or more sub-systems corresponding to the IoT automation system.

* * * * *